US009917822B2

(12) United States Patent
Livshits et al.

(10) Patent No.: US 9,917,822 B2
(45) Date of Patent: Mar. 13, 2018

(54) AUTOMATICALLY SECURING DISTRIBUTED APPLICATIONS

(71) Applicant: Microsoft Technology Licensing, LLC, Redmond, WA (US)

(72) Inventors: Benjamin Livshits, Kirkland, WA (US); Henricus Johannes Maria Meijer, Mercer Island, WA (US); Cedric Fournet, Cambridge (GB); Jeffrey Van Gogh, Redmond, WA (US); Danny van Velzen, Redmond, WA (US); Abhishek Prateek, Redmond, WA (US); Krishnaprasad Vikram, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 651 days.

(21) Appl. No.: 14/247,418

(22) Filed: Apr. 8, 2014

(65) Prior Publication Data
US 2014/0282879 A1 Sep. 18, 2014

Related U.S. Application Data

(62) Division of application No. 12/257,776, filed on Oct. 24, 2008, now abandoned.

(51) Int. Cl.
*G06F 15/173* (2006.01)
*H04L 29/06* (2006.01)
*G06F 21/52* (2013.01)
*G06F 7/04* (2006.01)

(52) U.S. Cl.
CPC .............. *H04L 63/08* (2013.01); *G06F 21/52* (2013.01); *G06F 2221/2101* (2013.01)

(58) Field of Classification Search
CPC ... G06F 21/52; G06F 2221/2101; H04L 63/08
USPC .................................................. 709/203, 224
See application file for complete search history.

(56) References Cited

U.S. PATENT DOCUMENTS

| 5,657,390 A | * | 8/1997 | Elgamal | .................. H04L 29/06 |
| | | | | 713/151 |
| 6,073,163 A | * | 6/2000 | Clark | .................... G06F 9/4443 |
| | | | | 709/203 |
| 2002/0046286 A1 | * | 4/2002 | Caldwell | ................. H04L 29/06 |
| | | | | 709/229 |

(Continued)

OTHER PUBLICATIONS

Office action for U.S. Appl. No. 12/257,776, dated Jan. 9, 2014, Livshits, et al., "Automatically Securing Ditributed Applications", 12 pages.

(Continued)

*Primary Examiner* — David Lazaro
*Assistant Examiner* — Vitali Korobov
(74) *Attorney, Agent, or Firm* — Drinker Biddle & Reath LLP

(57) ABSTRACT

A processing system for distributed multi-tier applications is provided. The system includes a server component that executes a replica of a client-side application, where a client component executes the client-side application. The client component captures events from the client-side application and transmits the events to the replica to validate the computational integrity security of the application.

20 Claims, 10 Drawing Sheets

(56) References Cited

U.S. PATENT DOCUMENTS

| | | | | |
|---|---|---|---|---|
| 2002/0112162 | A1* | 8/2002 | Cocotis | H04L 63/08 713/176 |
| 2004/0216150 | A1* | 10/2004 | Scheifler | G06F 21/57 719/330 |
| 2005/0193269 | A1* | 9/2005 | Haswell | G06F 11/3684 714/38.13 |
| 2006/0047604 | A1* | 3/2006 | Kraft-Oz | G06F 9/44573 705/59 |
| 2006/0143239 | A1* | 6/2006 | Battat | G06F 17/30371 |
| 2007/0083813 | A1* | 4/2007 | Lui | G06F 11/3612 715/709 |
| 2008/0071646 | A1* | 3/2008 | Hodson | G06Q 30/06 705/26.81 |
| 2009/0119302 | A1* | 5/2009 | Palmer | G06F 17/30368 |
| 2009/0150136 | A1* | 6/2009 | Yang | G06F 17/5022 703/13 |
| 2013/0097677 | A1* | 4/2013 | Beyer | H04L 63/0869 726/5 |

OTHER PUBLICATIONS

Non-Final Office Action for U.S. Appl. No. 12/257,776, dated Nov. 25, 2011, Benjamin Livshits et al., "Automatically Securing Ditributed Applications", 10 pages.

Office action for U.S. Appl. No. 12/257,776, dated Jun. 19, 2013, Livshits et al., "Automatically Securing Ditributed Applications", 12 pages.

Office action for U.S. Appl. No. 12/257,776, dated Jul. 18, 2012, Livshits et al., "Automatically Securing Ditributed Applications", 13 pages.

* cited by examiner

AUTOMATICALLY SECURING DISTRIBUTED APPLICATIONS

CROSS REFERENCE TO RELATED APPLICATIONS

This application is a divisional of U.S. patent application Ser. No. 12/257,776, filed on Oct. 24, 2008, and entitled "Automatically Securing Distributed Applications", the entirety of which is incorporated herein by reference.

BACKGROUND

Web applications are becoming increasingly distributed, marked by the emergence of popular AJAX (Asynchronous JavaScript and XML) applications such as Hotmail, Google Maps, Facebook, and many others. A typical multi-tier AJAX application consists of a server component implemented in Java J2EE or Microsoft .NETfor example and a client-side component executing in the browser. The resulting application is more performant and responsive, since computation is moved closer to the client, thus avoiding unnecessary network round trips. Unlike a computation performed entirely on the server however, when a portion of the code is moved to the client, the overall computation can no longer be trusted.

Indeed, a malicious client can easily manipulates data that resides on and code that runs within the browser using one of many readily available data tampering or debugging tools. For example, consider a JavaScript-based shopping cart within a typical e-commerce retail site such as Amazon.com that allows the user to add items, adjust their quantities, add coupons, compute the shopping cart totals, and so forth. When run on the client, this application can be compromised in a variety of ways. For instance, coupon validation checks can be dodged, allowing the user to reduce the total. Even simpler, the total computation can be compromised to set the total to an arbitrary, potentially even negative amount.

Due to the possibility of these attacks, almost every action in a typical shopping cart application today requires a round trip to the server, the latency of which can be quite noticeable, especially on mobile or long-distance connections. For non-malicious users, who constitute the majority, this unnecessary precaution leads to a much less responsive user experience. Moreover, the developer of the distributed application currently is responsible for splitting the application in a manner that places all security-sensitive operations on the server. While some language-based approaches have recently been proposed to address this problem, these techniques still require a great deal of developer involvement, making them difficult to use for existing large-scale projects.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A distributed execution system is provided that employs replicated application execution to automatically preserve the integrity of distributed computations between client and server applications. The system replicates a copy of client-side computations on a trusted server tier and captures user events such as keyboard or other command inputs (e.g., text inputs from a cell-phone client application). The captured user-initiated events are transferred to an abstract replica of the client (operated at the server) for execution, where the system observes results of the computation, both as computed on the client-side and on the server side utilizing the replica of the client-side code. Any discrepancy between server side execution via the replica and client execution results that are sent via messages are flagged as a potential violation of computational integrity. Most existing approaches for ensuring integrity of client computation involve the client sending a proof of certain properties that its execution state holds. The server efficiently validates these proofs convincing itself of the integrity of the client execution. For instance, the client could periodically send over its stack traces to the server, and the server could check the traces for any properties it desires. These techniques only provide a partial enforcement of integrity of client execution. The distributed execution system provides a more complete solution where integrity is guaranteed under a reasonable set of design assumptions.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided for validating security of remote applications. In one aspect, a distributed processing system for remote applications is provided. The system includes a server component that executes an abstract replica of a client-side application, where a client component executes the client-side application. It is noted that the replica only has to mimic the relevant details, but can omit many others such as the actual graphical rendering of the client-side user interface on the server, for example. The client component captures events from the client-side application and transmits the events to the replica to validate security of the client-side application. The events can be generated by a user or an application component. Security can be validated by comparing execution messages or observed states between the replica and the client side application.

As used in this application, the terms "component," "application," "event," "replica," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
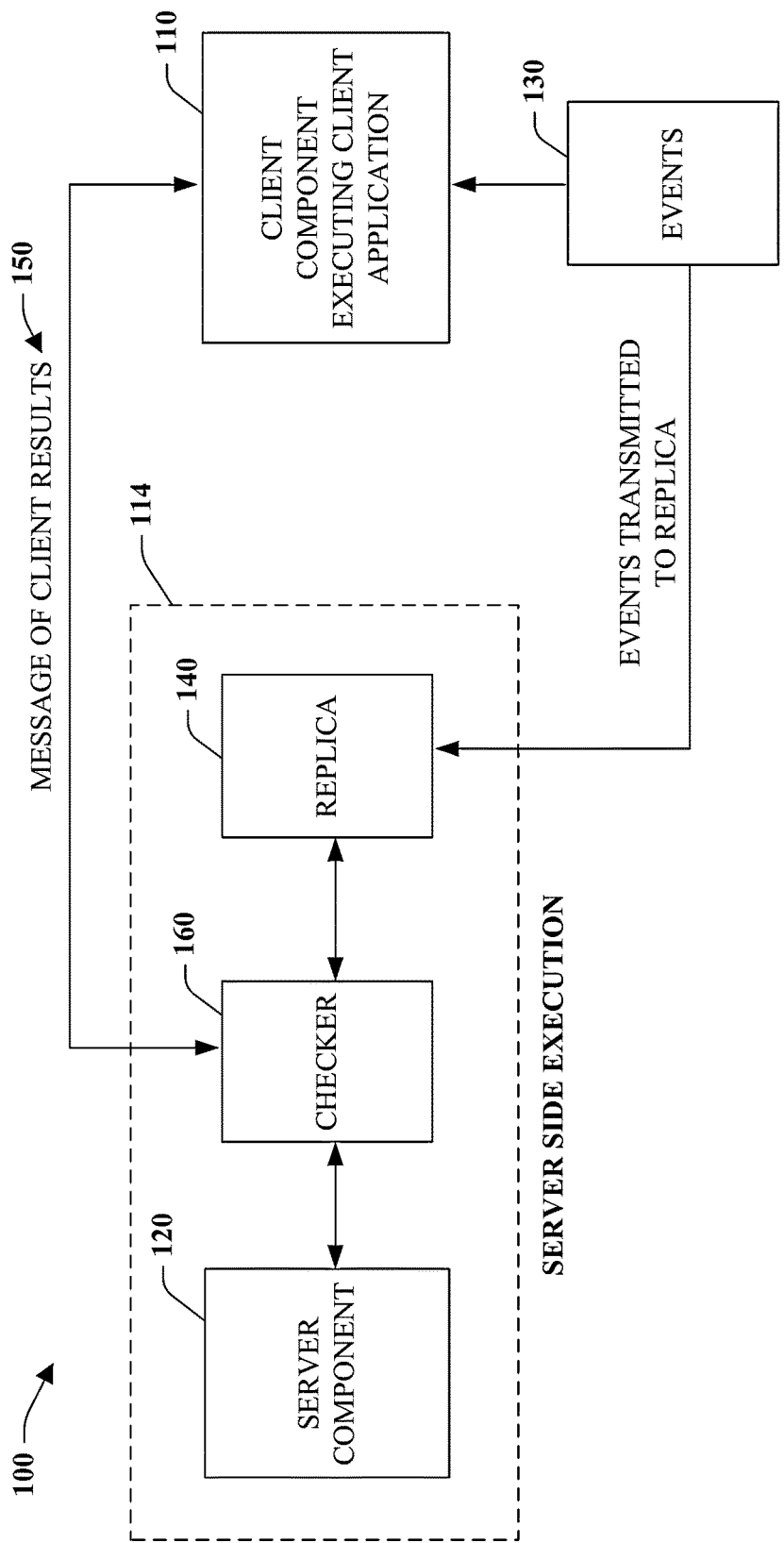
FIG. 1 is a schematic block diagram illustrating a system for validating security of remote applications.

Referring initially to FIG. 1, a system 100 is illustrated for validating security of remote applications. The system 100 provides security for applications that are split between a client tier operated by a client component 110 that executes a remote client application. A server tier 114 employs a server component 120 that operates in conjunction with the client component 110 to service the overall application that has been segmented between tiers. As the client component 110 is executing the client application, events 130 are monitored and transmitted back to an abstract replica 140 that mimics operation of the client application at the server tier 114. The events 130 are typically user generated and can come from a plurality of sources such as keyboards, mice, voice commands, touch screen commands, biometric operations, and so forth and are generally employed to control or direct the client application. It is noted that although the events 130 are typically generated by a user, that the events can also be machine or component-generated as well. As the client application executes on the client component 130, a message 150 is transmitted to a checker 160. The message 150 is constructed from actions of the client component 110 as it executes the client application and responds to the events 130.

Concurrently, as the events 130 are transmitted to the replica 140, the replica executes as if it were the client application. The replica generates a subsequent message and submits the message to the checker 160. The checker 160 then compares the message generated by the replica 140 and the message 150 generated by the client component 110. If the messages are the same (or within some predetermined threshold) then the checker can notify the client and the server that security is valid. If the respective messages are different, the checker can notify the client and the server that a security error has been detected. If an error is detected, several actions can occur. Error notifications can cause the client and the server to shut down. In another aspect, a re-boot message could be transmitted to the client and the application could be restarted where further checks could be employed by the checker to determine if security is valid. In yet another aspect, the client component 110 could be notified that a previous message checked invalid and that a previous section or portion of an application would need to be re-executed. As can be appreciated, a plurality of differing actions could occur upon error detection.

When a portion of application code is moved to the client, a malicious user can easily subvert the client side of the computation and potentially jeopardize sensitive server states. The system 100 employs replicated execution to automatically preserve the integrity of a distributed computation. The system 100 replicates an abstract replica of the client-side computation on the trusted server tier 114. Client-side events 130 are transferred to the replica 140 of the client for execution. The system 100 observes results of the computation, both as computed on the client-side and on the server side using the replica 140 of the client-side code. Any discrepancy is flagged as a potential violation of computational integrity. It is noted that checking may occur online, e.g., concurrently when the application is executed, or after the fact, as part of security auditing. In general, substantially any segmented application is supported for security verification and validation by the system 100.

A distributed Web application can be highly responsive because of client-side execution, but the results of this execution do not have to be trusted because they are replayed on the server via the abstract replica 140. Thus, the integrity of the overall distributed computation is the same as if the application had been run entirely on the server 120. The system 100 can even lead to better performance since the application is replicated on the server, which typically runs faster than the client. Remote procedure calls (RPCs) from the client can be anticipated and delivered to the client browser ahead of time, leading to low-latency RPCs and further enhancements in responsiveness. The system 100 capitalizes on a recent trend towards distributing compilers such as GWT, Links, Hilda, Swift, and Volta, for example. Distributing compilers allows both the client- and the server portion of the distributed application to be developed concurrently. As will be described in more detail below, the system 100 can be integrated with a Volta compiler, a distributing compiler that tier-splits .NET applications and translates them into JavaScript as needed. Integration with Volta significantly simplifies the process of code replication since the distributed application is given to the Volta compiler at the time of compilation. The system 100 also integrates into the RPC infrastructure of Volta, making the process of communication between remote system components on different tiers convenient. It is to be appreciated that Volta or other example applications described herein are but one example of a distributed application and means of creating them and substantially any application that can be segmented between remote computing systems or ways to create such an application are within the scope of the claimed subject matter.

Figure 2:
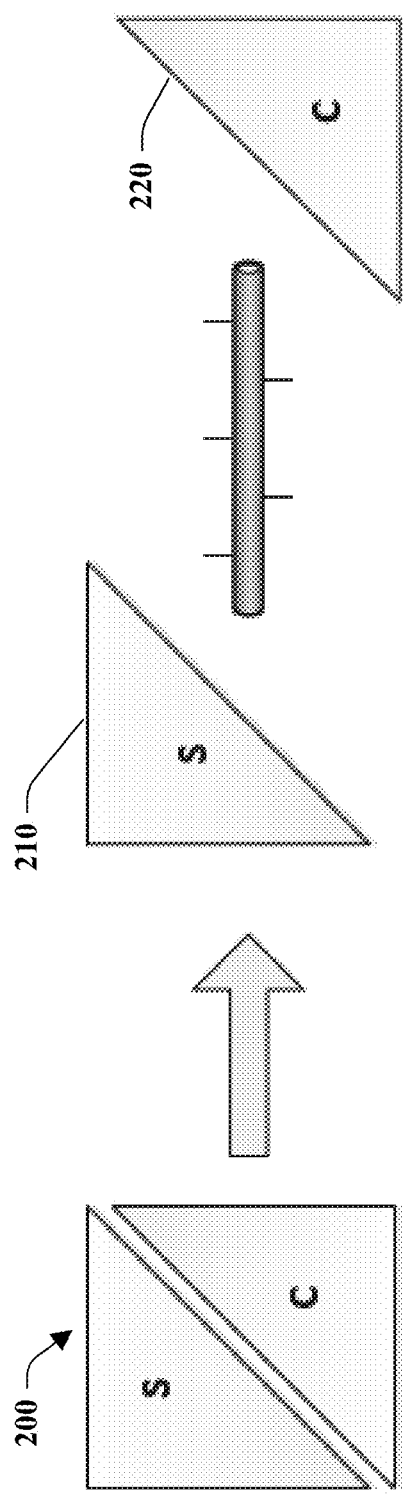
FIG. 2 is a block diagram that illustrates an example tier-split application.

Referring now to FIG. 2, an example tier-split application 200 is illustrated. An application 200 is split into a server-side component S 210 and a client-side component C 220. The client-side component C can be translated into JavaScript C' to be run within a browser. While the system approach described above with respect to FIG. 1, can be used for general AJAX-based Web applications (or others), integrating with Volta, for example, provides a number of clear advantages. As illustrated in FIG. 2, a Volta compiler is a distributing compiler that takes a .NET application as input and tier-splits it into a client and a server component by replacing appropriate cross-tier method calls by AJAX RPCs. Data is serialized before being sent to the server and de-serialized on the server when received. The client-side component is translated into JavaScript for execution within a standard browser.

Volta generally requires the developer to declaratively define which portion of the application runs on the server 210 and which part on the client 220 with the help of class-level annotations. Tier-splitting is performed subsequently as a .NET byte-code rewriting pass that reads the placement annotations, introducing RPCs as needed. To implement the system, the Volta tier-splitter can be augmented to perform additional rewriting steps described below. Base Volta libraries can also be augmented to provide support for browser emulation. As noted previously, Volta provides one possible implementation of a tier-split application but other types of implementations are possible.

Figure 3:
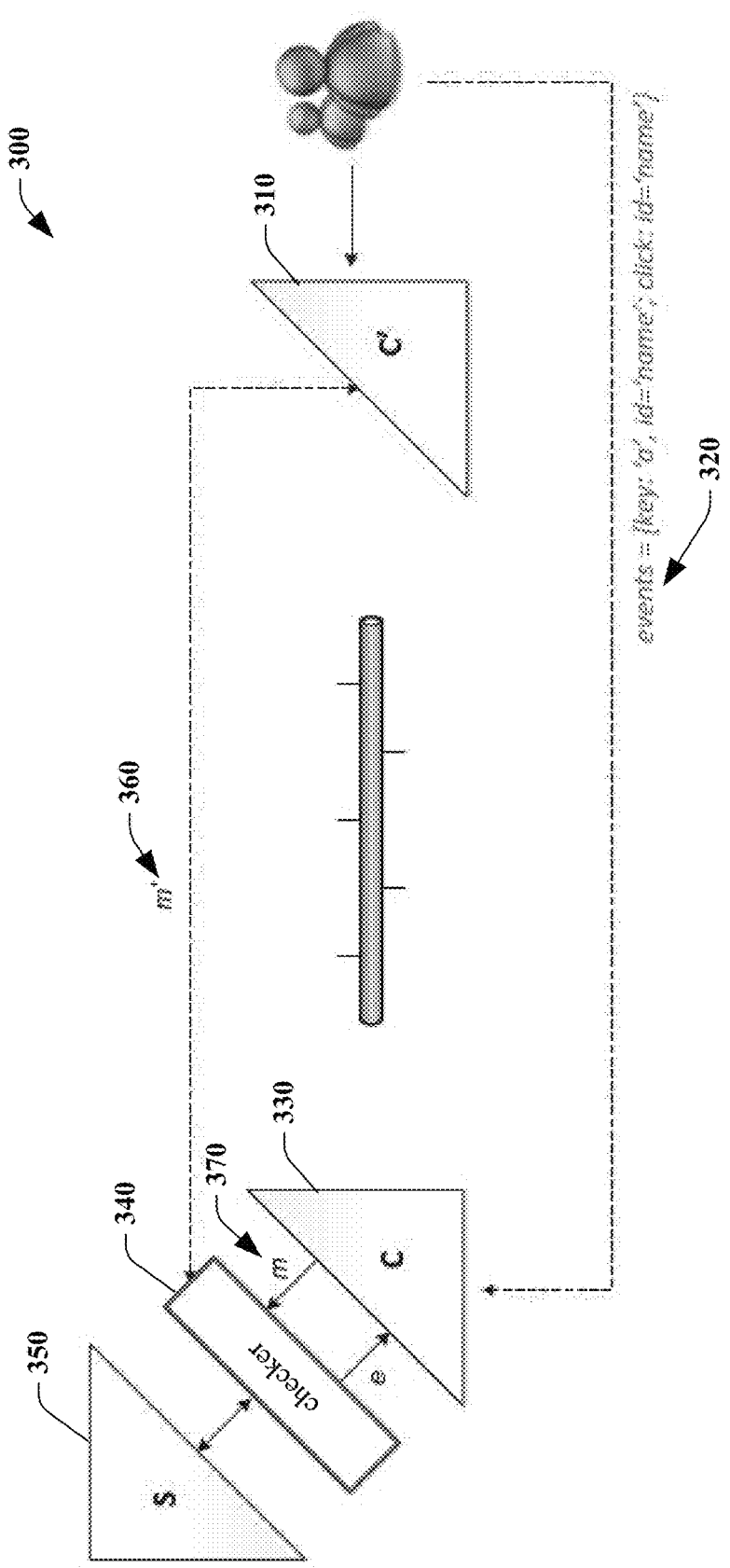
FIG. 3 illustrates an example security validation system.

Turning to FIG. 3, an example security validation system 300 is illustrated. The system 300 enhances the Volta application described above in the following manner: Capture user events: For example, the system 300 captures user events on a client C' 310 within a browser; Transmit events to the server for replay at 320: Events are transmitted to the client's replica C at 330 for replay; and Compare server and client results at 340. A server component S 350 is augmented with a checker 340 that compares arriving RPCs m' 360 and m 370 received from the client C' 310 and server-based client replica C 330, respectively, monitoring for discrepancies.

In general, the system 300 relies on re-execution to produce the correct result within C 330 based on user events that it receives, effectively ignoring malicious data changes that occur on the client 310. If the malicious changes result in different RPCs issued to the server 350, which constitutes the observable state, the checker 340 will flag a potential exploit and terminate that client's connection.

| Fragment (A) | Fragment (B) |
|---|---|
| // a custom button handler<br>this.button.Click += delegate {<br>    var name =<br>    this.userName.Value;<br>    var pass =<br>    this.passWord.Value;<br>    Login 1 = new Login( );<br>    1.attempt (name, pass);<br>} | // our rewriter adds the following<br>handler<br>this.button.Click += delegate {<br>    // capture the event<br>    HtmlEventArgs evt =<br>    this.Window.Event;<br>    // read target object ID<br>    var id − evt.__ __ ObjectId;<br>    // event type: keyboard, click, etc.<br>    Var type = evt.Type;<br>    // extra event-specific data<br>    Var data = serializeData(evt);<br>    // enqueue event for transfer<br>    __ __ ClientManager<br>        enqueueEvent (type, data, id);<br>} |

In general, the system 300 can be implemented as an optional addition to the Volta tier-splitting process that takes the original application and produces S 350 and C 330, then optionally translating C 330 into C' 310 that runs in JavaScript. It is noted that event capture can be performed with the help of the cooperating JavaScript interpreter or by introducing additional browser support. In the absence of such, event capture can be implemented differently. It is to be appreciated that the event capture examples shown and described herein are but one example implementation and various others are possible within the scope of the claimed subject matter. Integrating with the Volta tier-splitter allows the system to be implemented as several simple IL-to-IL byte-code rewriting passes. From the standpoint of the developer, enabling the system on an existing Volta application is straight-forward as ticking a checkbox in a Volta project configuration.

Prior to being translated to JavaScript, the client binary C 330 generated by the tier-splitter is rewritten to capture client-side user events. In the system 300, events 320 are classified into two types—primitive events and custom events. Primitive events include each key press and mouse click event, regardless of whether the application actually has registered any handlers for them. Custom events are those that the application has registered explicit handlers for. A typical handler for a button click event is shown in code Fragment (A) above. The events 320 are intercepted on the client 310 and relayed to C 330 for replay.

Tracking primitive events 320 helps maintain state of elements such as text areas and radio buttons, for example. For instance, each keystroke a user types into an HTML form can produce a separate keyboard event that is intercepted by the system and transferred to the replica 330. Note that not all JavaScript events that occur on the client have to be processed as doing so would involve listening to all MouseMove events, for example, which occur every time the user repositions the mouse pointer. This may be prohibitively expensive.

Primitive events 320 can be intercepted by registering a handler for each on the HTML BODY element. Since in the HTML event model, all events bubble up (or propagate) to the top-level document BODY element, it is a convenient point to intercept them. To intercept custom events 320, the system registers an extra handler shown in pseudo-code in code Fragment (B) above for each event of interest.

System-generated event handlers queue details about the event into an application-specific queue. In addition to the event type (key press, key release, and so forth), the serialized event details include the key code for keyboard-related events, mouse button information for mouse events, and so forth. Finally, the unique identifier corresponding to the object which raised the event can also be sent over.

Figure 4:
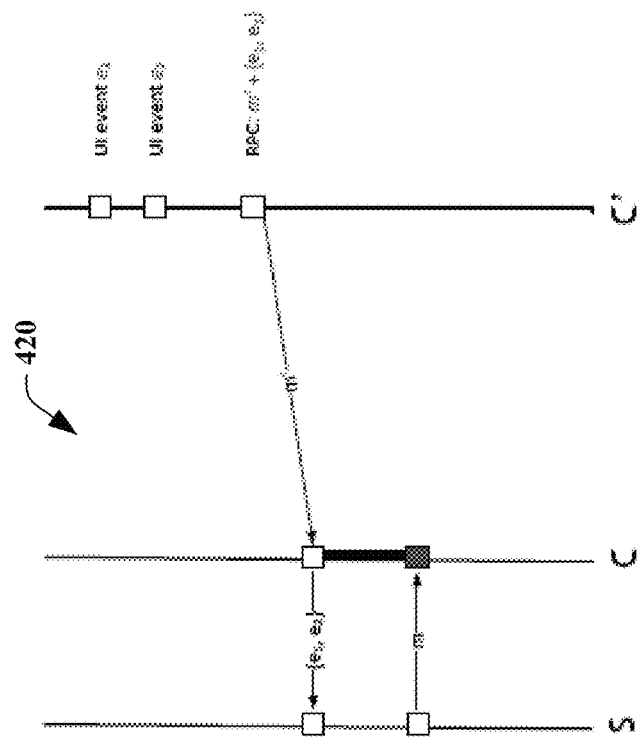
FIG. 4 illustrates example event transfer diagrams.
Figure 4:
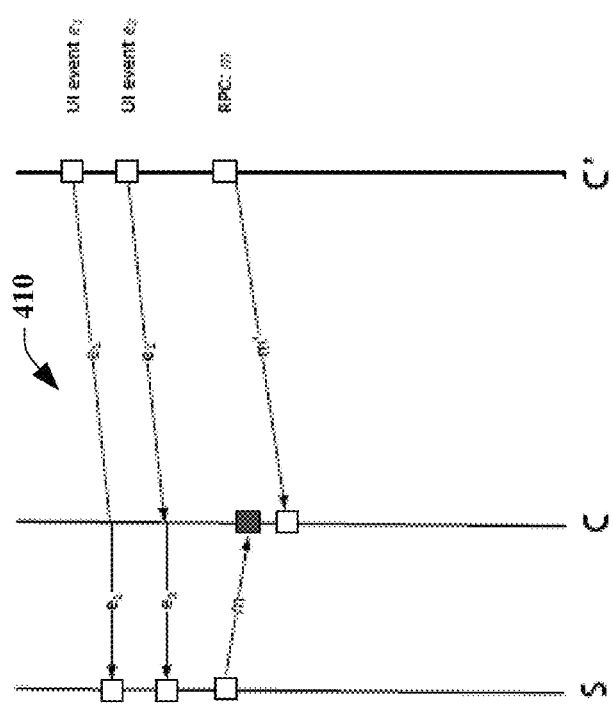

Referring now to FIG. 4, example event transfer diagrams are illustrated. To reduce the number of round trips to the server, which is likely to become a bottleneck on high-latency connections, events are relayed to the server in batches. Diagrams 410 and 420 show two scenarios of how events may be batched on the client and transmitted to the server. There is a natural trade-off between eager and lazy event transfer for example. As diagram 410 demonstrates, sending events eagerly results in excess network usage, which may be costly on a mobile connection, for instance, but can ensure speedy replication on the server. On the other hand, batching events longer as in the diagram 420 results in minimal network usage, but can delay the integrity checking and resulting server updates and responses. To resolve this trade-off between responsiveness and network usage, a simple middle-path strategy can be adopted. For efficiency, events can be batched until a queue reaches the maximum size of a network packet, in which case they are sent. Otherwise, when there is an RPC, events in the queue are flushed to the server.

Figure 5:
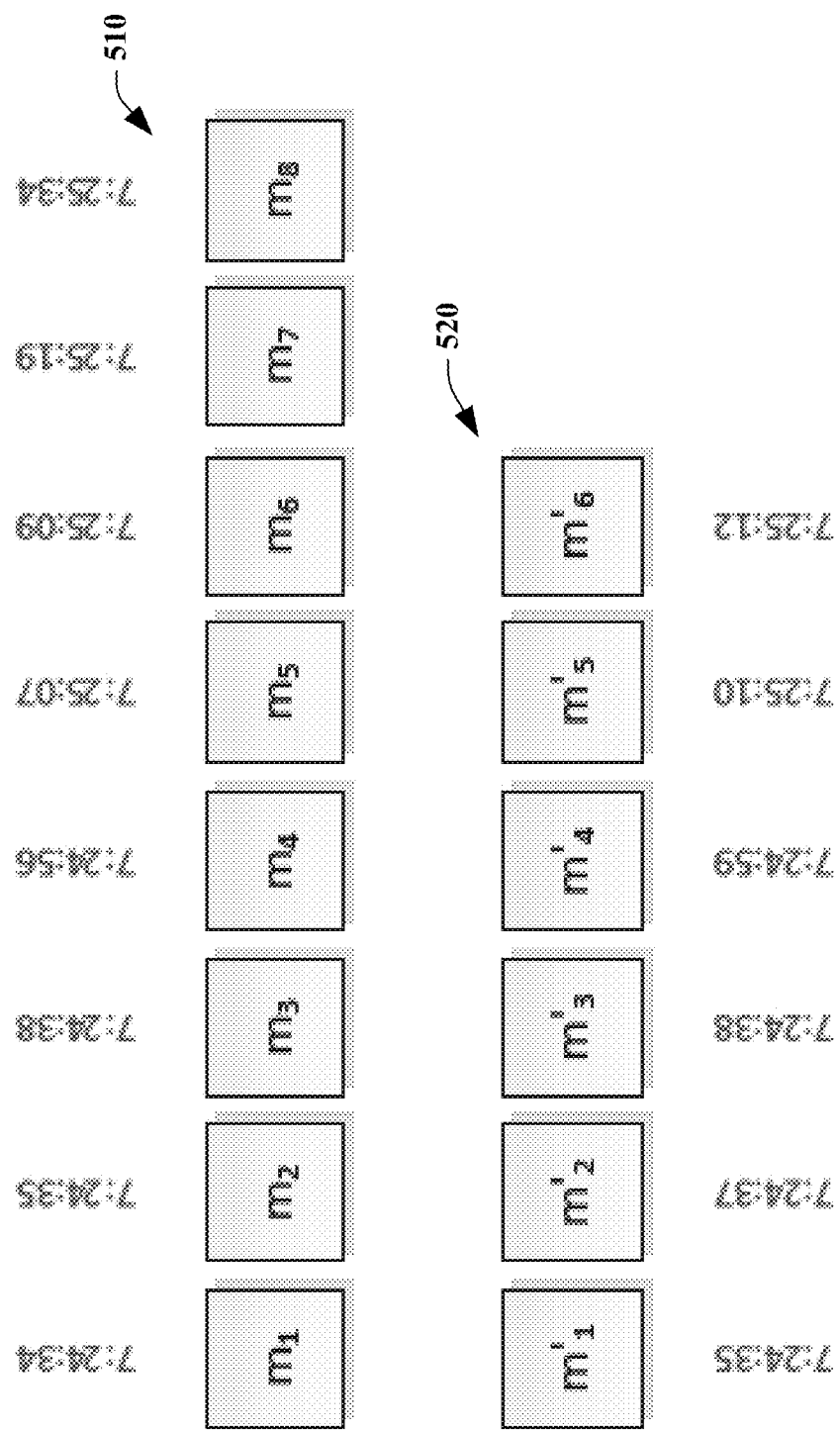
FIG. 5 illustrates audit logs for a security checker.

Referring to FIG. 5, audit logs for a security checker are illustrated. The system 300 described above modifies the server binary S to receive and properly handle events arriving from the client and relay them to the client replica C for replay. Events are de-serialized from the wire before being delivered to C. The system intercepts RPCs that are received from the JavaScript client and the replica and records them into audit logs 510 and 520. By default, the system waits until it receives and compares RPCs m and m'. Only when they are equivalent does the runtime relay the RPC call to the application server code. The return response from the server is again intercepted as a string at the HTTP level. Copies of the response are relayed to both the client replica C and the actual client C' over the network. Note that lock-step execution fashion is not the only option. Alternatively, the system could allow the server-side client replica C to move ahead, by relaying m to the server and sending back the response. When m' arrives, the server can confirm its equivalence with m. This is a likely scenario with over-provisioned servers and relatively slow clients.

An alternative approach consists of keeping audit logs for messages arriving from C and C' and to perform periodic cross-checking. Moreover, if RPCs are large, sending the entire RPCs is unnecessary—to save bandwidth, simply compute Message Authentication Codes (MAC) and send them over. Since there could be multiple clients connected to the same server, the client replica C is executed in its own AppDomain, a lightweight process-like abstraction in the .NET runtime. At runtime, the system maintains a separate AppDomain associated with each user session, and looks it up when a batch of events is received from the client. An advantage of using separate AppDomains is memory isolation: each uses its own heap and loads its own copy of dynamically linked libraries and maintains its copy of global data structures. Moreover, cross-AppDomain communications are cheaper than inter-process communication in general as they do not require a process context switch and AppDomains can share DLLs.

Figure 6:
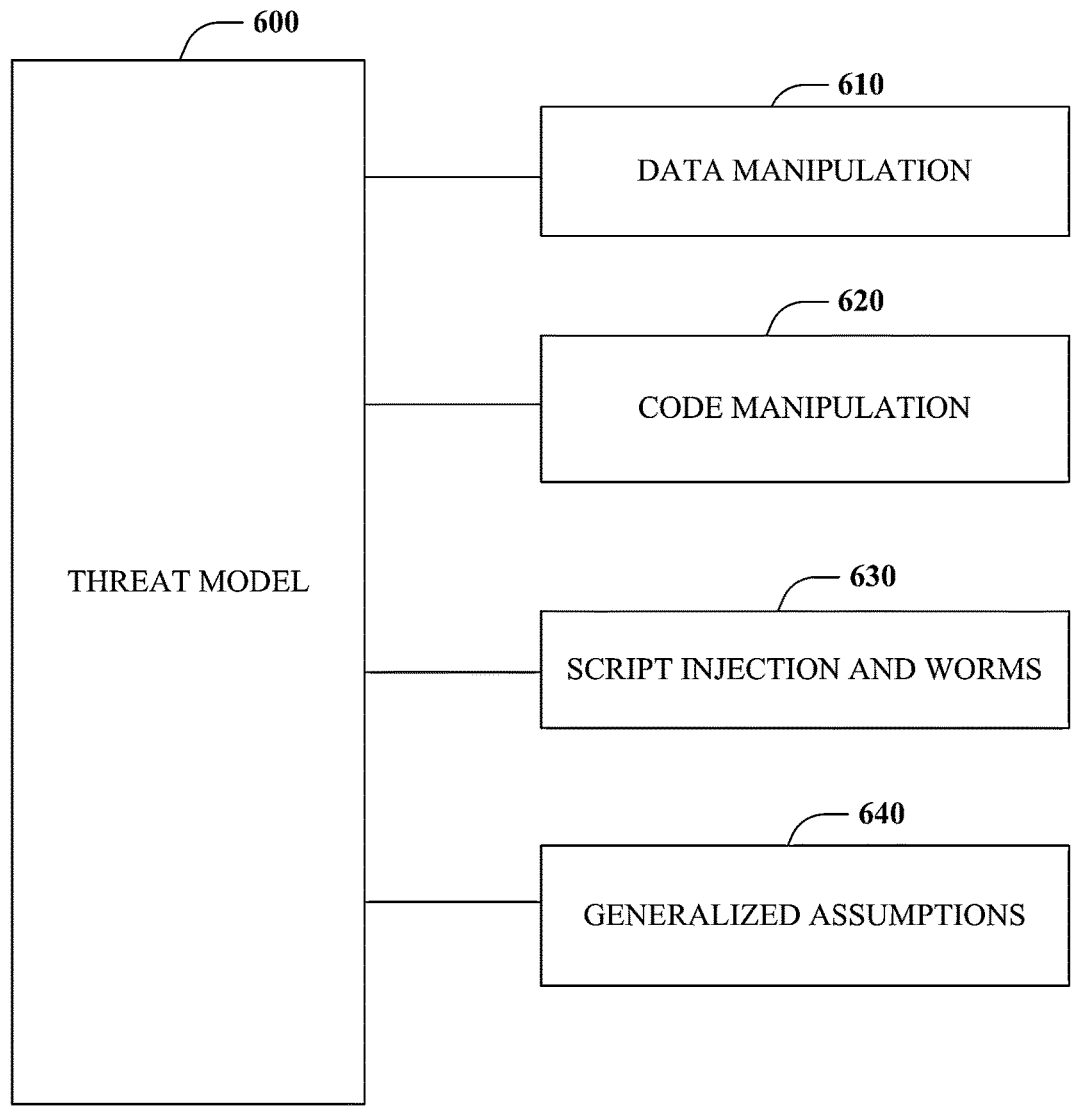
FIG. 6 illustrates an example threat model for a security validation system.

Proceeding to FIG. 6, an example security threat model 600 is illustrated. At 610, Data manipulation threats are considered. The most obvious kind of attack against a distributed Web application involves manipulation of data that is sent to the server. As in a shopping cart example, where the cart total could be forged easily, any piece of data that is transferred to the server can be easily manipulated within the browser using one of many readily available data tampering and debugging tools. Moreover, the integrity of data may also be compromised on the wire by a man-in-the-middle attack. Not only can a malicious client change existing data before it is sent over to the server, it can also choose to manufacture new messages. If considering the interface the server exposes as a set of commands, the client may choose to "drive" the server by invoking them out of order, potentially violating internal application logic.

Protection scheme for data manipulation: As mentioned above, the system uses re-execution to produce the correct result within the replica C based on user events that it receives, effectively ignoring malicious data changes that occur on the client. If the malicious changes result in discrepancies in the RPCs, this can cause the system to flag a potential exploit.

At 620, Code manipulation is considered. The code sent over to the client can be easily edited within the browser to produce a variety of undesired effects. For instance, consistency or input validation check can be easily removed, which is why these checks have been traditionally relegated to the server, thus making even the benign users incur a round trip overhead. In a game application for example, the user may manipulate the code to make it possible to circumvent the rules of the game. Often these changes are as simple as replacing the conditional of an if statement with true. In a language as dynamic as JavaScript, code changes may affect not only the current application, but others running within the same interpreter. A prime example of this is the prototype hijacking vulnerability, where a malicious widget in a mash-up overrides the Array constructor, thus allowing it to snoop on any of the other widgets.

Protection scheme for code manipulation: Note that the system does not try to prevent code tampering in general; indeed, adding a semicolon that does not change the program semantics cannot be detected. However, the system prevents code modifications that result in different RPCs being issued by the client.

At 630, Script injections and JavaScript worms are considered. While the threats above deal with the case of a malicious user, the system can actually help detect situations when benign users are affected by a malicious environment. Two examples of such a situation are injection attacks such as cross-site scripting and JavaScript worms, both of which allow for potentially malicious actions to be executed on part of an innocent user. As an example, consider an auction site such as eBay.com where users are either buyers or sellers. A malicious seller may embed JavaScript in the item description page so that when the item description page is viewed, a bid would be placed automatically on behalf of the viewer. Another common case is a worm on a social networking site such as the Samy worm on MySpace.com. When a particular page was viewed, a hidden embedded malicious script would add the viewer as Samy's MySpace friend.

Protection scheme for script injections and worms: Referring to FIG. 3 above, the replica C executes in the .NET CLR, not JavaScript, thus rendering injected JavaScript code non-executable when run within C. Thus, if the example above, the client-side component C' produces an RPC which will not even be issued by C, thus causing the system to observe a discrepancy.

At 640, basic security assumptions are considered. One basic assumption is that code executing on the server tier is believed to be uncompromised and trusted, whereas the client tier may be compromised. In one aspect, the event stream received from the client is a faithful representation of events that are generated by the user. If the application is running alongside malicious code in the browser that either suppresses, changes, or generates new events, there is little the system can do towards insuring the integrity of this computation. Currently, user events are captured by instrumenting the client code, but its trustworthiness can be enhanced by modifications to existing browsers that can ensure a path from the user's keyboard and mouse to the server runtime that cannot be tampered with using JavaScript. This may be easily implemented using an extension technology such as ActiveX controls for Internet Explorer or plug-ins for Firefox, for example.

In another aspect, program execution is considered deterministic. Allowing non-determinism will lead to differences in the execution of C and C' that are not captured by the system, thus resulting in false positives. Fortunately, there is a way to "virtualize" sources of randomness that are discussed below. For instance, if a random number generator is used, the client can block its execution until it gets the random number from the server. Similarly, for a computation that accesses local time, the server component can block until the time measurement arrives from the client.

Figure 7:
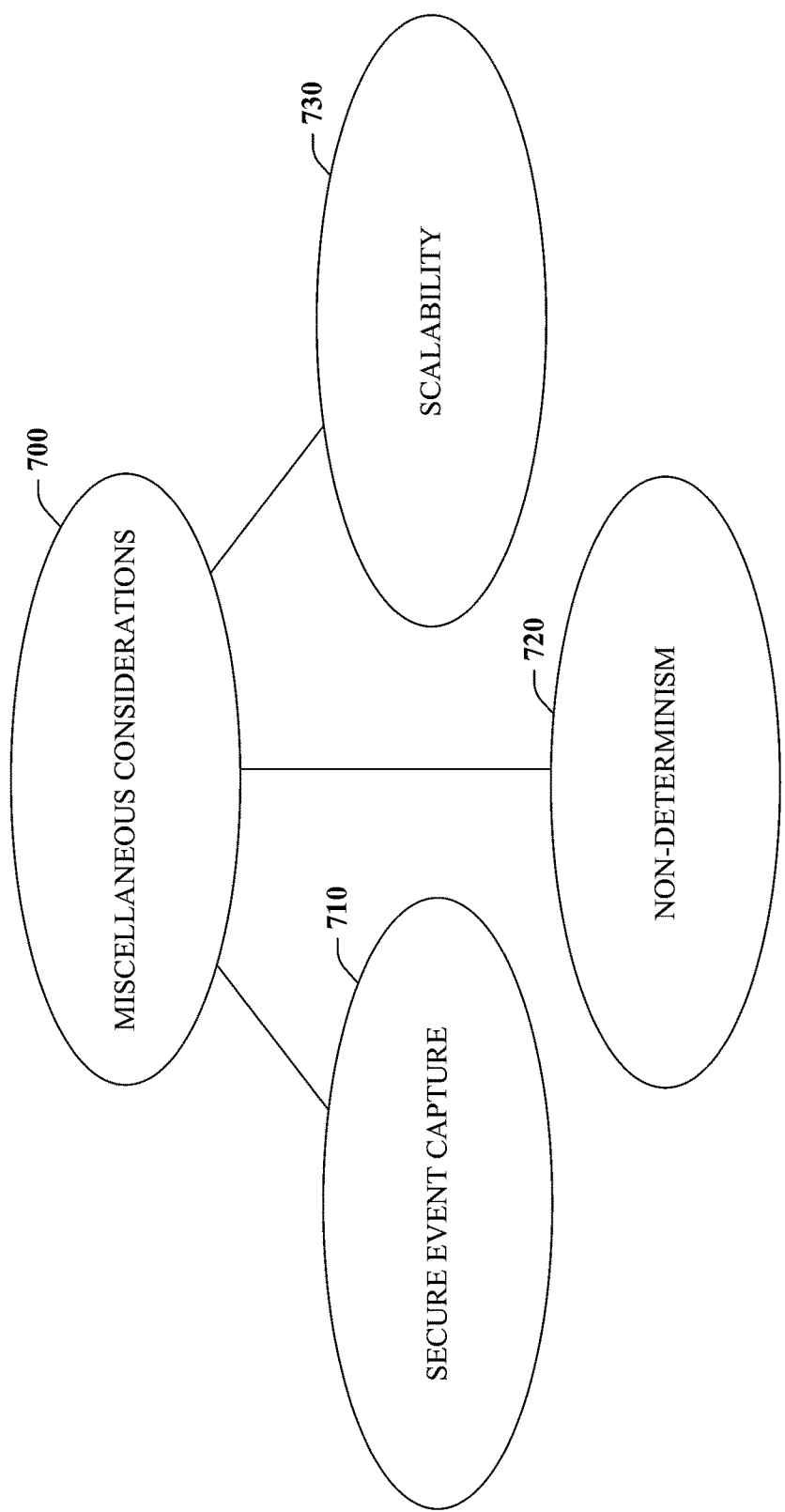
FIG. 7 illustrates miscellaneous considerations for a security validation system.

Referring now to FIG. 7, miscellaneous security considerations 700 are described. At 710, Secure Event Capture is provided. According to one assumption, the system can faithfully capture and transfer events on the client side to the replica. Since the malicious client may attempt to suppress or change the user event stream, it is best to implement this support at the level of either the browser or the JavaScript interpreter. This situation is not unlike what happens in the case of a remote display session. Once authenticated, the remote display client can communicate with the server. If the machine running client software has a key logger of a piece of malware installed that manipulates events destined for the remote computer, clearly the remote session will be affected by the malicious event stream.

At 720, non-determinism is considered. Reliance of having non-deterministic execution specified can be removed through additional instrumentation. The following sources of non-determinism are most common in Web applications, discussed in turn below:

Using the Random family of functions. JavaScript exposes a random number generator through function Math.Random. Unless additional measures are taken, the value returned by calls to this function on the client and the replica can disagree. A uniform approach to treating randomness is to perform the computation on one, "canonical" tier. In this case, instrument the client-side code C' to send the result of the call to Math.Random in the event stream. Provide a further instrument on the replica C to block until the outcome of the random call is received. When received, the result of the call is substituted in place.

Reading and measuring time. Access to time is provided through the Date object in JavaScript. Similarly to the approach described above, access to time routines can be instrumented and the replica can be blocked until the time measured on the client is delivered to continue the computation.

Accessing third-party servers. A systematic approach to deal with accessing third-party servers is to require that these accesses be tunneled through the server. For servers in a different domain, this may be necessary anyway, because of the same origin policy in JavaScript. This allows for easy centralized access to outside data for both the replica and the client-side code. Since calls to external services are performed once, this also deals with the issue of non-idempotent calls with side-effects.

In fact, a set of small changes to the JavaScript interpreter solves the issue of event delivery and also addresses the issues of non-determinism defined above. In particular, instrumenting Math.Random and Date routines as well as event handlers in the interpreter a systematic way to treat these issues that ensures that malicious JavaScript code co-existing within the same page—which is an attack model—is unable to gain access to this data. This effectively makes a portion of the browser or the JavaScript interpreter part of the trusted computing base. Since event capture is performed outside of JavaScript, it can also ensure that the overhead of this instrumentation is low. To ensure that event streams are not tampered with, standard techniques such as Message Authentication Codes can be employed. It is noted that the claimed subject matter provides the ability to virtualize client-side code execution by:

Capturing user events
Third-party interactions
Compensating for sources of non-determinism and timing. These features and others facilitate JavaScript or .NET runtime design.

At 730, Performance and Scalability is considered. Other system optimizations include: Actively "pushing" results to the client. An advantage of the system described above is that, once computed, RPC results can be actively pushed to the client. This way, when the RPC is finally issued on the client, its result will already be available, leading to low-latency RPCs. This demonstrates that not only does the system make the application more secure in many cases it can also make it more responsive. Deployment strategy for the system meshes nicely with the traditional load-balancing approach to deployment of large-scale Web applications. In particular, a load balancer could be used to repeatedly direct the same user to the server where both its replica and the corresponding server threads run. Currently, this functionality is implemented in the checker, which looks up the appropriate AppDomain for a user session. Moreover, to save memory, both the server thread and the replica can be serialized on high server load for long-running sessions and then brought back from disk.

Figure 8:
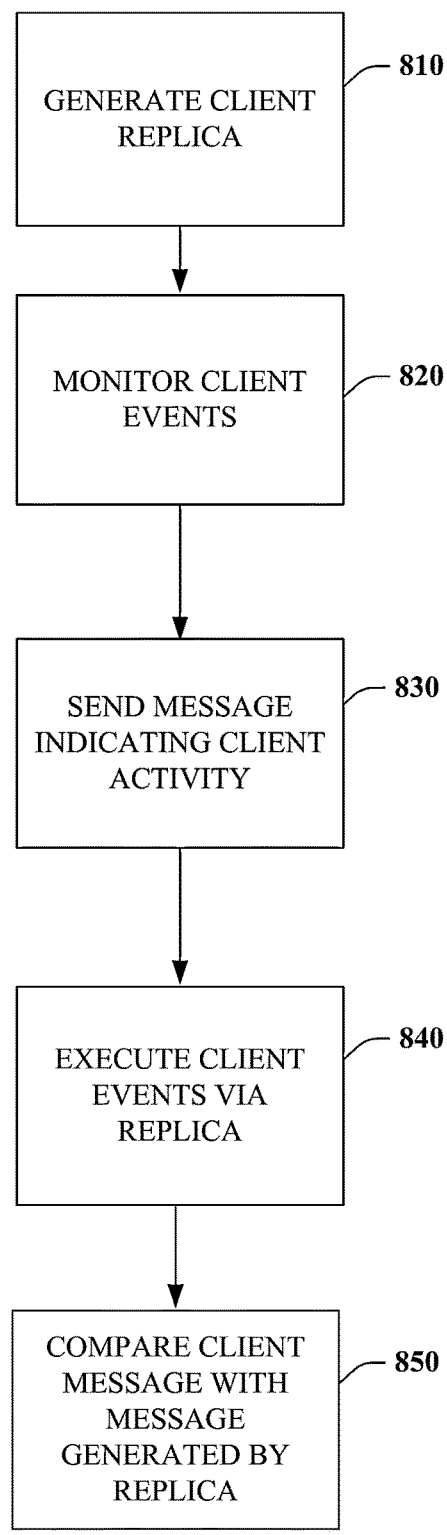
FIG. 8 illustrates an exemplary process for verifying security of remote applications.

FIG. 8 illustrates an exemplary process 800 for providing security in remote client and server applications. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 810, a client application replica is generated that is executable on a server that is remote from the client component or machine. As noted above, a tier-splitting application can be employed to generate the remote client application and the replica. At 820, client events are monitored and processed by the client component and by the replica. As noted previously, these can include keyboard activities, mouse activities, or substantially any input that alter the state of the remote client application. After the inputs events have been monitored, a message is generated that indicates how the client responded to the respective events. At 830, the message indicating client activity is transmitted to the server application. Concurrently to the client, the replica also processes the received events and generates its own execution message at 840. Proceeding to 850, the replica message and the client-generated message of 830 are compared. If the messages compare, execution of the remote application can continue in a substantially unimpeded manner. If a discrepancy is detected between messages at 850, error events can be generated. As noted previously, various responses to errors can be set up including retries, reboots, or prevention of further remote client activity until the source of the security violation is detected. Remote troubleshooting and guidance can be optionally generated and delivered to the user in order to help them determine the source of the respective security violation or other detected error. Alternatively, means of error recovery can be provided.

Figure 9:
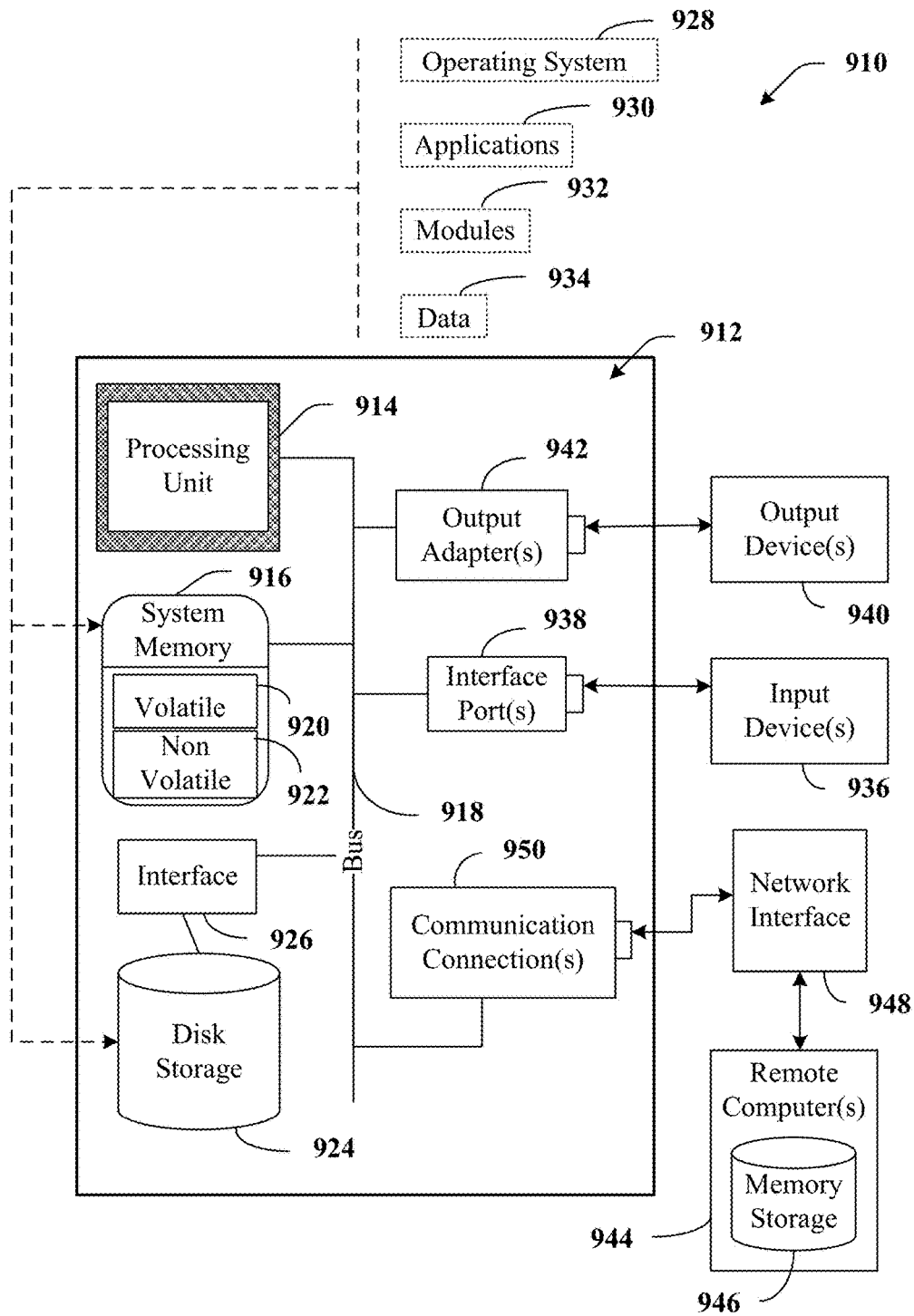
FIG. 9 is a schematic block diagram illustrating a suitable operating environment.
Figure 10:
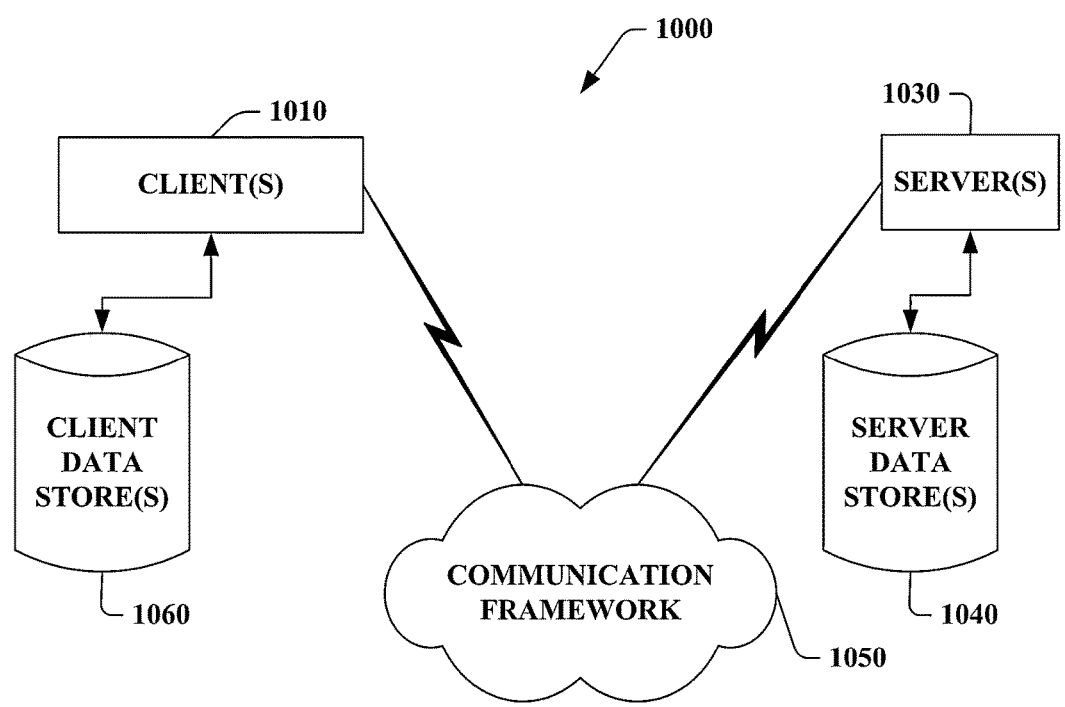
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system for securing distributed client-server applications, the system comprising:
memory;
one or more processors for executing a server component configured to:
execute a server-side application as part of a distributed application, wherein the distributed application further includes a client-side application for execution by a client component;
execute a replica of the client-side application;
receive events and one or more messages from the client-side application;
replay the events at the replica to generate one or more associated messages;
compare the one or more generated messages to the one or more received messages to at least in part validate security of the client-side application; and
when the security of the client-side application is not validated, transmit a command to the client component to stop execution of the client-side application.

2. The system of claim 1, wherein the events are generated by user interaction with a browser application component of the client component.

3. The system of claim 1, wherein at least a subset of the events received include at least one of a key press on a keyboard, a touch on a touch screen or a mouse click on a mouse.

4. The system of claim 1, wherein the security of the client-side application is validated when the one or more generated messages are equivalent to the one or more received messages.

5. The system of claim 1, further comprising a component configured to generate an error event if the security of the client-side application is not validated.

6. The system of claim 1, further comprising tier-splitting components configured to automatically generate the client-side application and the replica, wherein the client-side application is translated into a first programming language and the replica is translated into a second programming language that differs from the first programming language to enhance security of the replica.

7. The system of claim 1, the replica provides relevant functionality of the client-side application in order to compute a desired integrity checking result from an event stream.

8. The system of claim 1, wherein the client-side application includes an asynchronous interpreted programming language based web application.

9. The system of claim 1, wherein the one or more received messages include one or more remote procedure calls.

10. The system of claim 1, wherein the client-side application is translated into an interpreted programming language for execution within a web browser.

11. The system of claim 1, further comprising an event handler inserted into the client-side application through code rewriting.

12. The system of claim 1, further comprising an event handler inserted into the client-side application through runtime modifications.

13. The system of claim 1, further comprising a component to batch events to reduce performance overhead.

14. The system of claim 1, further comprising an audit log that is generated to compare messages or observable states between the client-side application and the replica.

15. The system of claim 14, the audit log is examined online in real time, examined at a later time, or provides a sample for further analysis.

16. The system of claim 15 further comprising a method authentication component that is transmitted in lieu of a complete message inside of a remote procedure call.

17. The system of claim 1, wherein the client component executes on a remote client.

18. A system for securing distributed client-server applications, the system comprising:
memory;
one or more processors for executing components comprising:
a server component that executes an abstract replica of a client-side application, the client-side application including a client-side portion of a distributed client-server application, the server component configured to:
receive events and remote procedure calls (RPCs) generated in response to the events from the client-side application; and
validate security of client-side application execution by comparing at least:
RPCs generated by the abstract replica in response to the events to the RPCs received from the client-side application, wherein when the security of the client-side application execution is not validated, the server component notifies the client-side portion to stop execution of the client-side application.

19. A method comprising:
executing, by a trusted server component on a server, a server-side application as part of a distributed application, wherein the distributed application further includes a client-side application for execution by a client component on a remote client;

executing, by the trusted server component, an abstract replica of the client-side application;

receiving, by the trusted server component, events and one or more messages associated with the events from the remote client-side application;

replaying, by the trusted server component, the events at the abstract replica to generate one or more associated messages; and comparing, by the trusted server component, the one or more messages generated at the abstract replica to the one or more received messages to at least in part validate a security or an integrity of the client-side application, wherein when the security or the integrity of the client-side application is validated, passing, by the trusted server component, the one or more received messages to the server-side application for processing as part of execution of the distributed application.

20. The method of claim 19, wherein when the security or integrity of the client-side application is not validated, transmitting, by the trusted server component, a command to the client component to stop execution of the client-side application.

* * * * *